Jan. 16, 1962 E. L. MATSON 3,016,616
COMBINATION MARKING LINE AND PLUMB BOB
Filed April 21, 1959
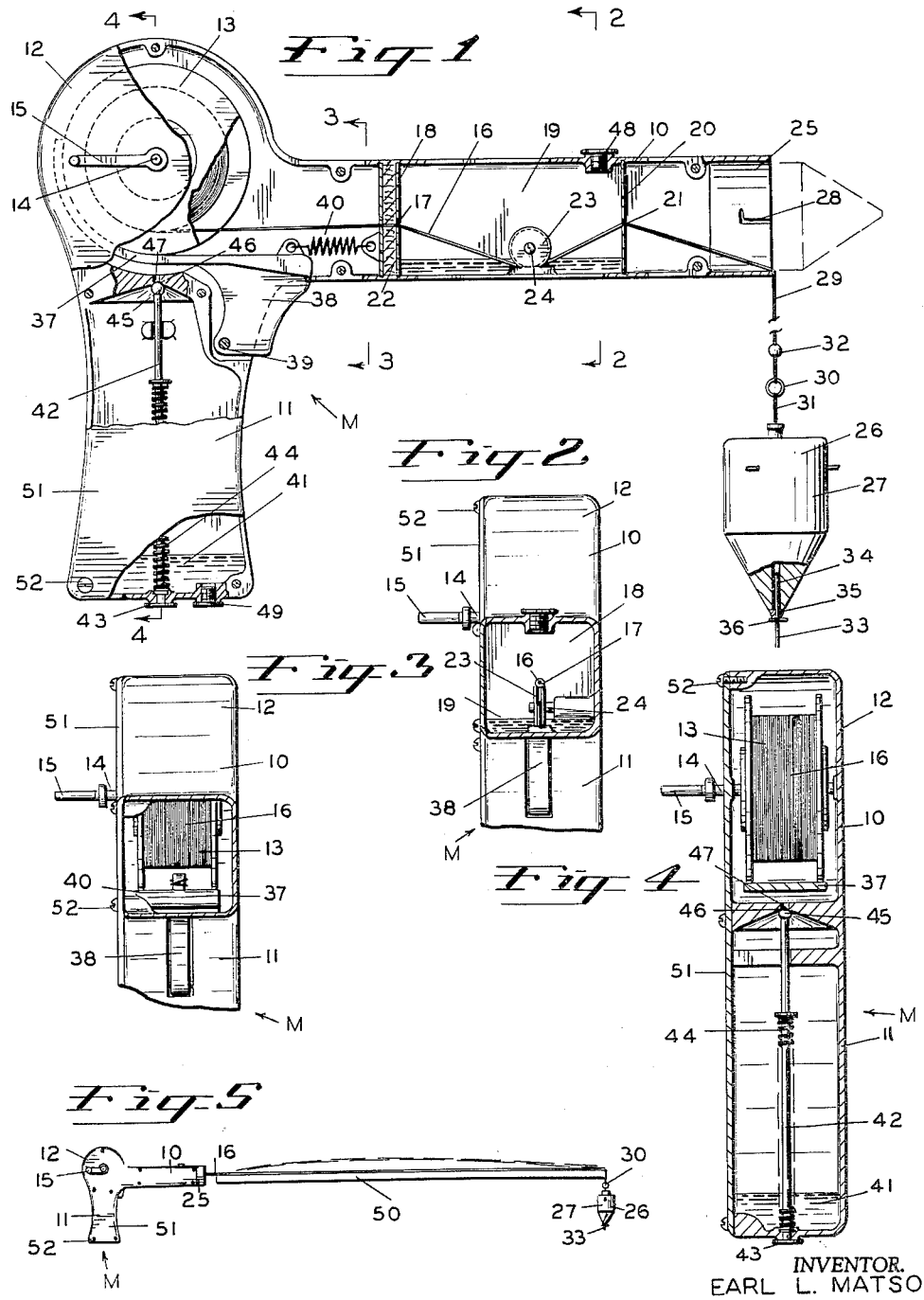
INVENTOR.
EARL L. MATSON
BY
Kimmel & Crowell
ATTORNEYS United States Patent Office 3,016,616
Patented Jan. 16, 1962

3,016,616
COMBINATION MARKING LINE AND PLUMB BOB
Earl L. Matson, 5135 SW. View Point Terrace, Portland 1, Oreg.
Filed Apr. 21, 1959, Ser. No. 807,815
1 Claim. (Cl. 33—87)

The present invention relates to a combination marking line and plumb bob of the type used by carpenters.

The primary object of the invention is to provide a combination marking line and plumb bob using a liquid dye coating for the line for making the mark when the line is stretched from one point to the other and used similar to a chalk line.

Another object of the invention is to provide a carrying case for holding the marking line and a plumb bob associated with the line.

A still further object of the invention is to provide a carrying case having a pistol shape so that it can be carried easily by the carpenter within his pocket, or in a holster, for instant use.

A further object of the invention is to provide a combination marking line and plumb bob with the plumb bob having a removable marking tack associated therewith which is automatically brought into position under the plumb bob when making a bench mark.

Other objects and advantages will become apparent in the following specification when considered in light of the attached drawings, in which:

FIGURE 1 is a side view of the invention with parts broken away and in section for convenience of illustration;

FIGURE 2 is a fragmentary vertical sectional view, taken on line 2—2 of FIGURE 1, looking in the direction of the arrows;

FIGURE 3 is a fragmentary vertical sectional view, taken on line 3—3 of FIGURE 1, looking in the direction of the arrows;

FIGURE 4 is a vertical sectional view, taken on line 4—4 of FIGURE 1, looking in the direction of the arrows; and FIGURE 5 is a side elevation of the invention which illustrates the device marking a line across the upper surface of a piece of material.

Referring now to the drawings in detail wherein like reference characters indicate like parts throughout the several figures, the reference character M indicates generally a combination marking line and plumb bob constructed in accordance with the invention.

The marking line and plumb bob combination M includes an elongated generally rectangular casing 10 having a depending hollow handle grip 11 integrally connected thereto by a semicylindrical casing 12. The casing 12 has a reel 13 mounted therein and fixedly secured to a cross shaft 14 journalled in the casing 12, as best illustrated in FIGURE 4. Removably connected to an outer end of the shaft 14 is a hand crank 15.

A marking line 16 has one of its ends fixedly secured to the hub of the reel 13 and is wound thereon with its opposite end passing through an opening 17 in a bulkhead 18, which forms one end of a dye containing well 19. The opposite end of the well 19 is closed by another bulkhead 20 having an opening 21 through which the line 16 passes. A sealing material 22, formed of felt or the like, engages the bulkhead 18 to prevent dye leakage past the line 16 from the well 19. A similar structure not shown may be used with the bulkhead 20 when desired.

In order to insure complete dye saturation, the line 16 is held under the surface of the dye by the sheave 23 which is journalled transversely of the well 19 on a cross shaft 24. The outer end of the rectangular casing 10 terminates in a hollow cylindrical cross sectional portion 25 and is adapted to receive therein the cylindrical body 26 of a plumb bob 27. The plumb bob 27 is held therein by a bayonet connection 28 when the device is not in use. The outer end 29 of the line 16 is secured to the plumb bob 27 by a ring 30 passing through an eye 31 forming part of the plumb bob 27.

When the plumb bob 27 is in storage position, a resilient ball 32 on the line 16 engages the opening 21 of the bulkhead 20, providing a seal for the opening 21.

One of the outstanding features of this plumb bob 27 is a removable pin 33 which has one end inserted in an axial opening 34 of the plumb bob 27. The pin 33 is held in place either by a small magnet 35, or frictional contact within the opening 34 of the plumb bob 27. The magnet 35 contacts a collar 36 on the pin 33 and when the plumb bob 27 is dropped on to a surface, the sharpened tip of the pin 33 penetrates the surface. The plumb bob is then withdrawn and the pin 33 will remain in the surface, marking the position where the plumb bob 27 made its contact. This saves considerable time and effort in the locating of the marked position and the driving of a nail or tack.

Operating against the rim of the reel 13 is a brake shoe 37 which forms part of a trigger member 38 pivotally mounted to the handle 11 at 39. The brake shoe 37 is applied to the rim of the reel 13 by action of a spring 40. When it is desired to release the line 16, allowing the same to be played out from the reel 13, the operator pulls on the trigger 38 to overcome the tension of the spring 40 and release the brake shoe 37 from the rim of the reel 13. The moment he releases the trigger 38, the reel 13 will be stopped by reengagement of the brake shoe 37.

In order to keep the line 16 in a pliable condition, it is lubricated by a lubricating fluid 41 stored within the handle 11. In order to lubricate the line 16, the device is turned to a question where the handle 11 is over the reel housing 12 and the plunger 42 is pulled outwardly by its enlarged head 43 against the action of the spring 44. The spring 44 biases the enlarged end 45 of the plunger 42 against the seat 46 of the opening 47. An outward pull on the plunger 42 will permit a limited amount of lubricating fluid 41 to pass through the opening 47 and on to the line 16 reeled on the reel 13.

The dye is fed into the chamber 19 by removing a filler plug 48, and the lubricating fluid 41 is fed into the handle 11 by removing a plug 49. A one piece removable closure plate 51 is provided to close one side of the casing 10, handle 11 and casing 12, and is held thereto by screws 52 to permit access to the interior of the entire assembly.

The use and operation of the invention is as follows: The device M is carried on the person of the user. When it is time to use the same, for instance as a plumb bomb, the operator releases the plumb bob 27 from its bayonet fitting 28 and releases the brake 37 from the reel 13 by moving the trigger 38. This allows the plumb bob 27 to drop straight down from the portion 25 of the casing 10. When the plumb bob 27 strikes the object thereunder on which a bench mark is to be applied, the pin 33 will be forced into the surface, then by reeling the line 16 back on the reel 13 turned by the crank 15, the plumb bob 27 may be brought up to its storage position, as indicated by the broken lines in FIGURE 1, or the same may be strung out, as indicated in FIGURE 5, over a piece of material 50, dropping down over the edge of the material 50, as indicated at the outer end of the line 16, the opposite end of the line 16 being brought down by the device, as indicated, after which the operator will lift the line 16 to the broken line position, allowing the same to snap down, striking the surface of the material 50 making a line thereon.

It has been found where a liquid dye is used on the line 16, that a much clearer mark is obtained and one that will be more permanent than is obtained with a chalk line. Further, the dye can be used on any type of material by having a special type of dye as required. As the line 16 is brought back on to the reel 13, the surplus dye is wiped off when passing through the opening 17 of the bulkhead 18. When being played out the surplus dye is removed from the line by passing through the opening 21 of the bulkhead 20.

Having thus described the preferred embodiment of the invention, it should be understood that numerous structural modifications and adaptations may be resorted to without departing from the scope of the appended claim.

What is claimed is:

A combination plumb bob and marking line comprising a hollow housing, a handle, said housing and said handle at substantially right angles to each other, a reel journalled in a compartment integrally formed at the juncture of said handle and said housing, a marking line wound on said reel, a dye chamber in said housing, said line extending through said dye chamber, bulkheads defining said dye chamber, said bulkheads having apertures formed therein through which the line passes, means to prevent dye leakage through one of said bulkheads, means in said dye chamber guiding said line beneath the surface of dye contained in said chamber, said handle providing a lubricant chamber, said handle having apertures formed in the bottom wall and top wall thereof, a spring biased plunger disposed in one of said apertures and having one end removably seated in the aperture in the top wall whereby movement of said plunger will permit lubricating fluid to pass through the aperture in the top wall onto said line when the tool is in inverted position.

References Cited in the file of this patent

UNITED STATES PATENTS

| | | |
|---|---|---|
| 268,168 | Avery | Nov. 28, 1882 |
| 517,720 | Anderson | Apr. 3, 1894 |
| 932,218 | Wilson | Aug. 24, 1909 |
| 1,271,470 | Ibaraki | July 2, 1918 |
| 2,589,500 | Landon et al. | Mar. 18, 1952 |

FOREIGN PATENTS

| | | |
|---|---|---|
| 793,187 | France | Nov. 16, 1935 |
| 867,679 | France | Aug. 25, 1941 |
| 74,619 | Norway | Aug. 20, 1947 |
| 618,216 | Great Britain | Feb. 17, 1949 |